United States Patent [19]

Clarke

[11] 4,003,020
[45] Jan. 11, 1977

[54] DIGITAL SIGNAL TRANSMISSION
[75] Inventor: Christopher Keith Perry Clarke, Crawley, England
[73] Assignees: The Marconi Company Limited; Standard Telephones & Cables Limited, both of London, England
[22] Filed: June 30, 1975
[21] Appl. No.: 592,021
[30] Foreign Application Priority Data July 3, 1974 United Kingdom ............ 29516/74

[52] U.S. Cl. .................................. 340/146.1 AL
[51] Int. Cl.² ........................................ G06F 11/10
[58] Field of Search ....... 340/146.1 AG, 146.1 AL, 340/146.1 R, 146.1 AV; 360/38; 358/8

[56] References Cited

UNITED STATES PATENTS

| | | | |
|---|---|---|---|
| 3,037,697 | 6/1962 | Kahn | 340/146.1 AL |
| 3,386,081 | 5/1968 | Varsos | 340/146.1 R |
| 3,569,934 | 3/1971 | Parr, Jr. | 340/146.1 AG |
| 3,718,903 | 2/1973 | Oiso et al. | 340/146.1 AL |
| 3,747,065 | 7/1973 | Gibson | 340/146.1 R |
| 3,818,442 | 6/1974 | Solomon | 340/146.1 AL |
| 3,831,144 | 8/1974 | En | 340/146.1 AL |
| 3,849,761 | 11/1974 | Kasahara et al. | 340/146.1 R |
| 3,913,068 | 10/1975 | Patel | 340/146.1 AL |

OTHER PUBLICATIONS

Bossen and Patel, Encoder and Decoder for the 2-Redundant B-Adjacent Perfect Codes, IBM Tech. Discl. Bulletin, vol. 14, No. 3, Aug. 1971, 680–682.

Primary Examiner—Charles E. Atkinson
Attorney, Agent, or Firm—Kemon, Palmer & Estabrook

[57] ABSTRACT

Digital words are transmitted together with associated parity or checking digits. The parity bits are each related to a group of bits of the same significance from several different words. At a receiving station, a parity bit is generated for the same group from the incoming words and compared with the corresponding received parity bit. When the generated and received parity bits differ, a value is estimated for each word containing a bit from the respective group, and the estimated and received values for the word are compared to detect any word containing an erroneous bit, which bit is then corrected.

19 Claims, 5 Drawing Figures

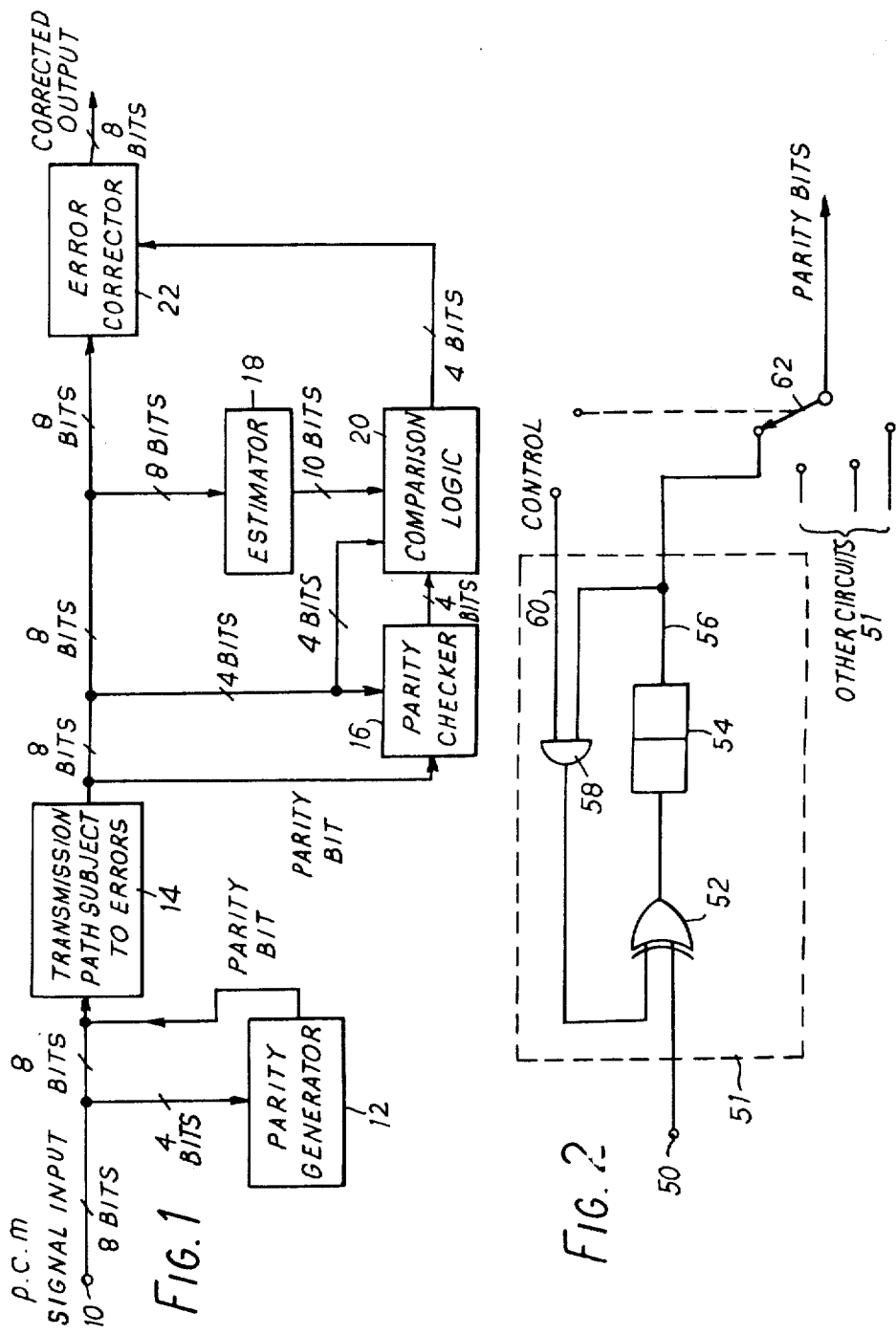

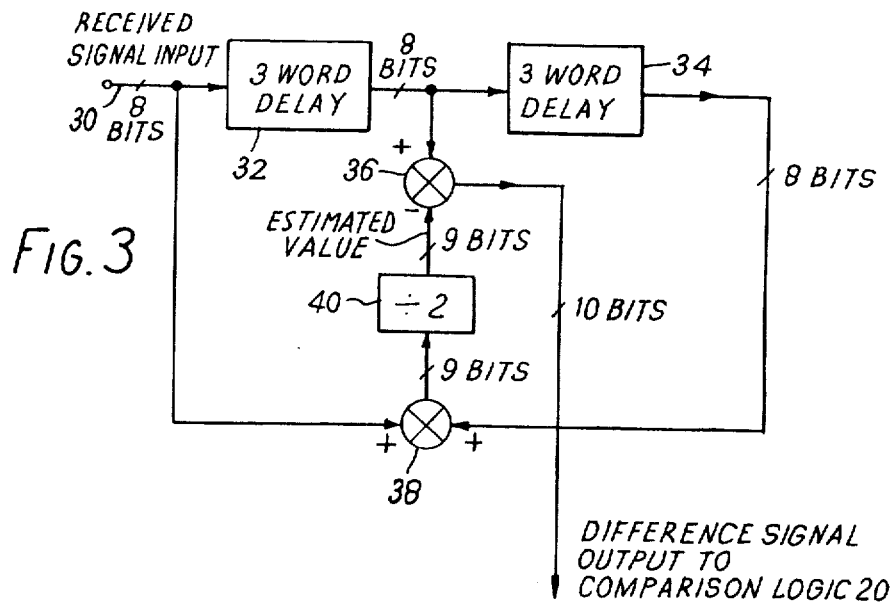
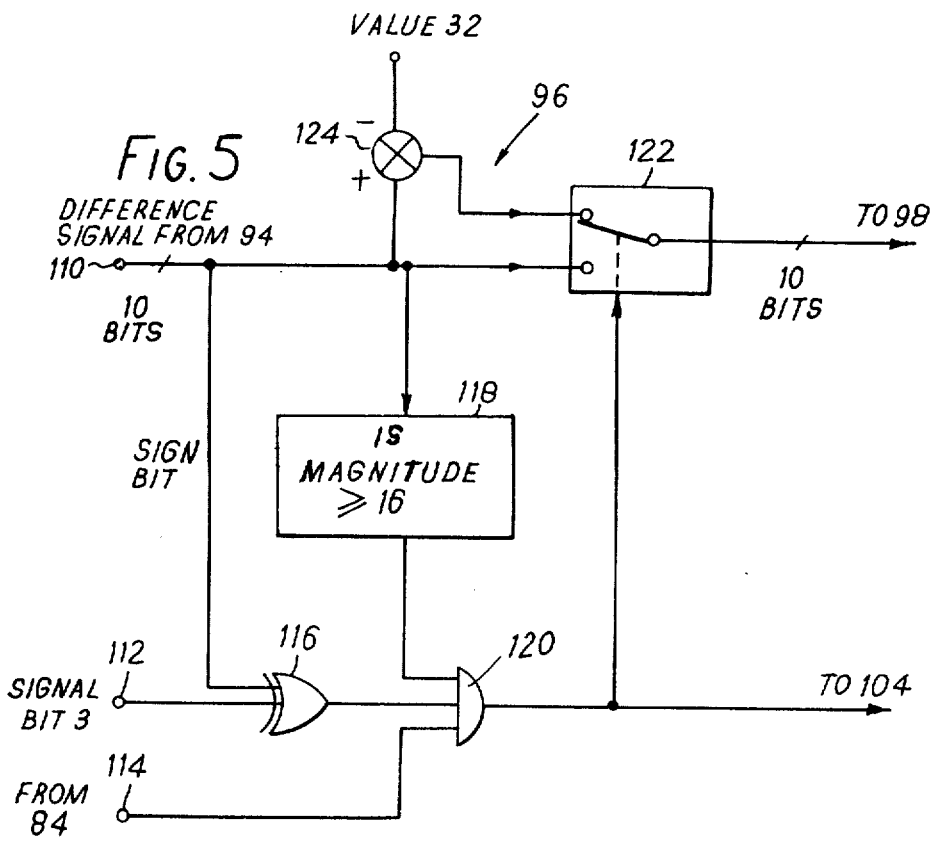

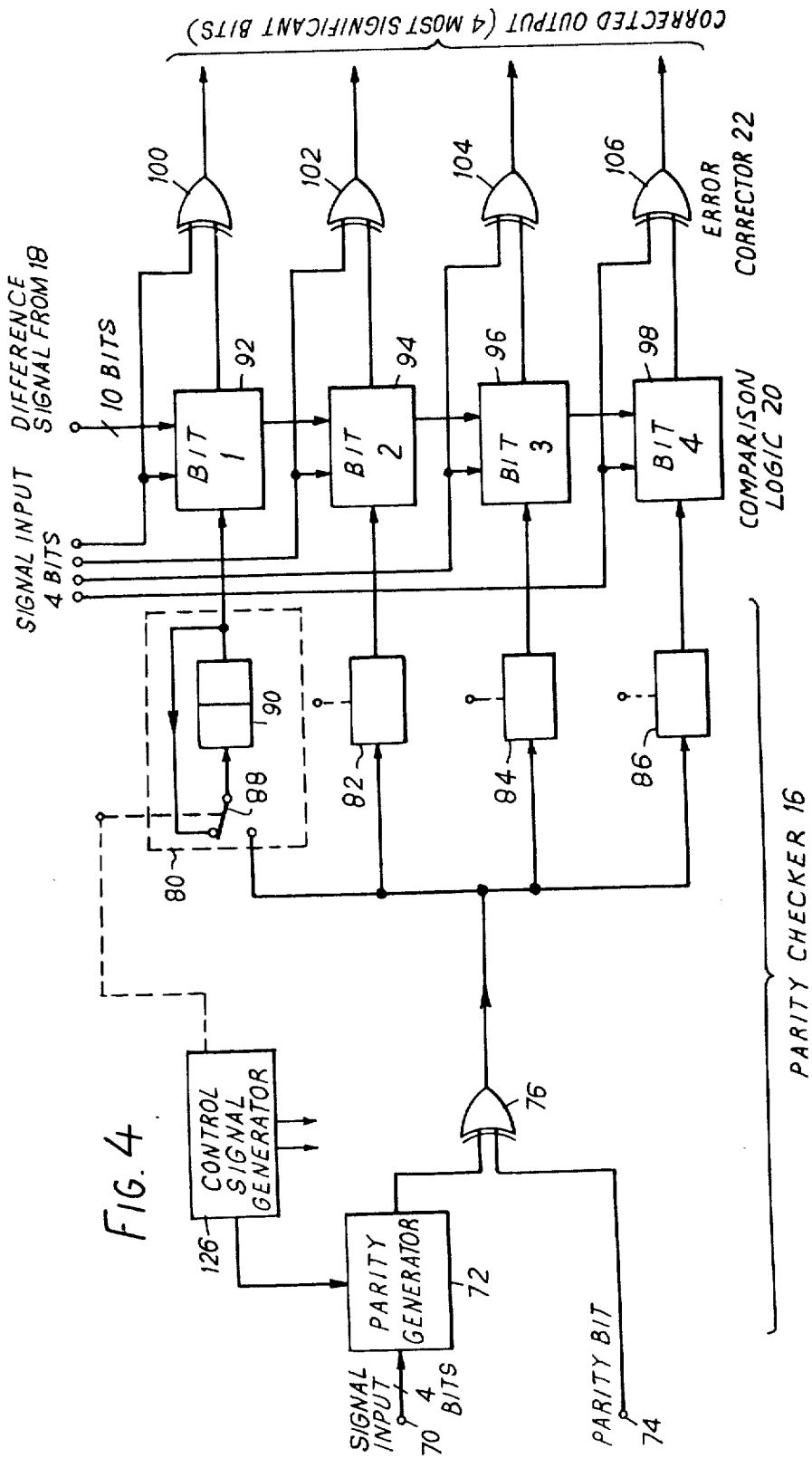

DIGITAL SIGNAL TRANSMISSION

This invention relates to the transmission of digital signals.

In digital television systems the video signal is commonly represented by a series of eight-digit binary numbers. If any of the bits are altered by errors, then the effect appears as a brightness error in the picture, the magnitude of which depends on the significance of the affected bit.

Extra bits, known as parity bits, can be added to the signal to reduce the effect of errors. Each parity bit may typically describe the modulo-two sum of a group of bits in the signal; the rules of modulo-two addition, for which the symbol $\oplus$ is used, being as follows:

$$0 \oplus 0 = 0$$

$$0 \oplus 1 = 1$$

$$1 \oplus 0 = 1$$

$$1 \oplus 1 = 0$$

An exclusive-OR gate is a well known circuit which effects modulo-two addition. An odd number of errors in a group is shown by disagreement between the parity digit and the modulo-two sum of the digits, but an even number of errors in a group cannot be detected since the modulo-two sum of the digits is the same as for no errors. For a particular error rate, the probability of more than one error occurring in a group increases with the size of the group, so it is an advantage to keep the number of signal bits protected by one parity bit small.

Conventionally, one parity bit is assigned to protect each eight-bit word of the television signal. Then, if an error is indicated, the protected word is discarded in its entirety and replaced by a value which will "conceal" the error. Suitable values for substitution are the average of the two adjacent samples in monochrome signals or the average of samples one or more colour subcarrier period away in colour signals. The accuracy of the values calculated in this way is such that errors in the fifth and less significant bits are generally less noticeable than the errors caused by this "concealment". Therefore it is usual to protect only the four most significant bits of each word with a parity bit.

Table 1 shows an array of eight consecutive words, labelled $a$ to $h$, each made up of eight bits. Digit $a_1$ is the most significant bit of word $a$ representing 128 levels in the signal, $a_2$ the next in significance representing 64 levels, and so on down to $a_8$ which is the least significant digit of word $a$ and represents one level in the signal.

TABLE 1

| Significance | Words | | | | | | | |
|---|---|---|---|---|---|---|---|---|
| 128 | $a_1$ | $b_1$ | $c_1$ | $d_1$ | $e_1$ | $f_1$ | $g_1$ | $h_1$ |
| 64 | $a_2$ | $b_2$ | $c_2$ | $d_2$ | $e_2$ | $f_2$ | $g_2$ | $h_2$ |
| 32 | $a_3$ | $b_3$ | $c_3$ | $d_3$ | $e_3$ | $f_3$ | $g_3$ | $h_3$ |
| 16 | $a_4$ | $b_4$ | $c_4$ | $d_4$ | $e_4$ | $f_4$ | $g_4$ | $h_4$ |
| 8 | $a_5$ | $b_5$ | $c_5$ | $d_5$ | $e_5$ | $f_5$ | $g_5$ | $h_5$ |
| 4 | $a_6$ | $b_6$ | $c_6$ | $d_6$ | $e_6$ | $f_6$ | $g_6$ | $h_6$ |
| 2 | $a_7$ | $b_7$ | $c_7$ | $d_7$ | $e_7$ | $f_7$ | $g_7$ | $h_7$ |
| 1 | $a_8$ | $b_8$ | $c_8$ | $d_8$ | $e_8$ | $f_8$ | $g_8$ | $h_8$ |
| Parity bits | $P_a$ | $P_b$ | $P_c$ | $P_d$ | $P_e$ | $P_f$ | $P_g$ | $P_h$ |

Associated with the eight words of the signal are eight parity bits $P_a$ to $P_h$. With the coventional arrangement of one parity bit assigned to the four most significant digits of each word, the parity bits and the signal bits are related by equations of the form:

$$P_a = a_1 \oplus a_2 \oplus a_3 \oplus a_4$$

$$P_b = b_1 \oplus b_2 \oplus b_3 \oplus b_4$$

$$P_h = h_1 \oplus h_2 \oplus h_3 \oplus h_4$$

When a parity digit is found to differ from the modulo-2 sum of the first four digits of the associated word, it is known that one of those four digits is incorrect. However, it is not known which digit is incorrect, and thus the whole word is discarded and replaced by concealment. This means that the concealment provides a relatively poor approximation to the correct signal.

According to this invention there are provided a method of an apparatus for generating parity digits for a digital signal which comprises a plurality of words each of which consists of a plurality of bits, in which a group of bits of the same significance are selected from several different words with a predetermined selection law, and the bits of the group are combined with a predetermined combination law to provide a parity bit associated with the selected group.

When an error is indicated each word which contains a bit from the suspect group can then be compared with the value for that word estimated from nearby words (in the signal or in the information which the signal represents) and the value which gives the best agreement with the estimate can be chosen for the suspect bit.

The invention also provides a method of and apparatus for detecting errors in a received digital signal which comprises a plurality of words each of which consists of a plurality of bits, the signal having parity bits, in which one parity bit is generated for each of a group of bits of the received signal to correspond with the received parity bits, the corresponding generated and received parity bits are compared, and when the generated and received parity bits differ in respect of a group, a value is estimated for each word containing a bit from the respective group, and the estimated and received values are compared to detect any word containing an erroneous bit.

In this way errors can be corrected rather than concealed, the error caused by concealment being avoided.

The invention will now be described in more detail, by way of example. Reference will be made to the accompanying drawings, in which:

FIG. 1 is a block circuit diagram of a transmission system including an error correction system embodying the invention;

FIG. 2 is a block circuit diagram of one section of a parity generator for use in the error correction system of FIG. 1;

FIG. 3 is a block circuit diagram of an estimator for use in the system;

FIG. 4 is a block circuit diagram of a parity checker, comparison logic and an error corrector for use in the system; and FIG. 5 shows one of the comparison circuits in more detail.

As some of the nearby words in the waveform are to be used to estimate the value of suspect words, it is necessary to arrange that these words are from a different group from the subject words. An arrangement which is convenient for some estimation methods is to combine the bits of alternate words together in parity groups. This arrangement will be illustrated with reference to Table 2.

Table 2

| Significance | Words |
| --- | --- |
| 128 | $a_1$ $b_1$ $c_1$ $d_1$ $e_1$ $f_1$ $g_1$ $h_1$ |
| 64 | $a_2$ $b_2$ $c_2$ $d_2$ $e_2$ $f_2$ $g_2$ $h_2$ |
| 32 | $a_3$ $b_3$ $c_3$ $d_3$ $e_3$ $f_3$ $g_3$ $h_3$ |
| 16 | $a_4$ $b_4$ $c_4$ $d_4$ $e_4$ $f_4$ $g_4$ $h_4$ |
| 8 | $a_5$ $b_5$ $c_5$ $d_5$ $e_5$ $f_5$ $g_5$ $h_5$ |
| 4 | $a_6$ $b_6$ $c_6$ $d_6$ $e_6$ $f_6$ $g_6$ $h_6$ |
| 2 | $a_7$ $b_7$ $c_7$ $d_7$ $e_7$ $f_7$ $g_7$ $h_7$ |
| 1 | $a_8$ $b_8$ $c_8$ $d_8$ $e_8$ $f_8$ $g_8$ $h_8$ |
| Parity bits | $P_{1r}$ $P_{1u}$ $P_{2r}$ $P_{2u}$ $P_{3r}$ $P_{3u}$ $P_{4r}$ $P_{4u}$ |

In this method the eight parity bits and the eight words are related by equations of the form:

$$P_{1r} = a_1 \oplus c_1 \oplus e_1 \oplus g_1$$
$$P_{1u} = b_1 \oplus d_1 \oplus f_1 \oplus h_1$$

$$P_{4r} = a_4 \oplus c_4 \oplus e_4 \oplus g_4$$
$$P_{4u} = b_4 \oplus d_4 \oplus f_4 \oplus h_4$$

That is, each parity bit is based on bits of the same significance selected from four different words. These four words are not successive words but are spaced by an intervening word to facilitate the generation of an estimated word. These four bits form a group and are combined in accordance with module-2 addition to provide a single parity bit.

An example will be described comparing the conventional concealment method with a correction method in accordance with this invention as applied to the four most significant bits of eight words of a television waveform. In both cases the same data will be used. In the data the second digit of the fourth word has been changed from a '1' to a '0'. This changes the value of the word from 75 to 11. Table 3 illustrates the concealment method.

TABLE 3

| | | Concealment | | | | | | | |
| --- | --- | --- | --- | --- | --- | --- | --- | --- | --- |
| | | Word Numbers | | | | | | | |
| | | 1 | 2 | 3 | 4 | 5 | 6 | 7 | 8 |
| Decimal values of signal words: | 161 | 137 | 105 | 74 | 11 | 107 | 137 | 158 | 167 | 165 |
| Significance | | | | | | | | | |
| 128 | 1 | 1 | 0 | 0 | ⓪ | 0 | 1 | 1 | 1 | 1 |
| 64 | 0 | 0 | 1 | 1 | ⓪ | 1 | 0 | 0 | 0 | 0 |
| 32 | 1 | 0 | 1 | 0 | ⓪ | 1 | 0 | 0 | 1 | 1 |
| 16 | 0 | 0 | 0 | 0 | ⓪ | 0 | 0 | 1 | 0 | 0 |
| 8 | 0 | 1 | 1 | 1 | 1 | 1 | 1 | 1 | 0 | 0 |
| 4 | 0 | 0 | 0 | 0 | 0 | 0 | 0 | 1 | 1 | 1 |
| 2 | 0 | 0 | 0 | 1 | 1 | 1 | 0 | 1 | 1 | 0 |
| 1 | 1 | 1 | 1 | 0 | 1 | 1 | 1 | 0 | 1 | 1 |
| Parity bits: | | 1 | 0 | 1 | ① | 0 | 1 | 0 | 0 | |

An error is indicated in the fourth word of the block (value 11) because:

$$0 \oplus 0 \oplus 0 \oplus 0 \neq 1$$

The relevant bits in Table 3 have been circled. Therefore, in the conventional concealment method, the word is entirely discarded and replaced by the average of the preceding and subsequent words, that is by: $(74 + 107 / 2) = 91$ (rounded up).

Table 4 illustrates the same data in which the parity digits are derived as described with reference to Table 2.

TABLE 4

| | | Correction | | | | | | | |
| --- | --- | --- | --- | --- | --- | --- | --- | --- | --- |
| | | Word Numbers | | | | | | | |
| | | 1 | 2 | 3 | 4 | 5 | 6 | 7 | 8 |
| Decimal values of signal words: | 161 | 137 | 105 | 74 | 11 | 107 | 137 | 158 | 167 | 165 |
| Significance | | | | | | | | | |
| 128 | 1 | 1 | 0 | 0 | 0 | 0 | 1 | 1 | 1 | 1 |
| 64 | 0 | 0 | ① | 1 | ⓪ | 1 | ① | 0 | ① | 0 |
| 32 | 1 | 0 | 1 | 0 | 0 | 1 | 0 | 0 | 1 | 1 |
| 16 | 0 | 0 | 0 | 0 | 0 | 0 | 0 | 1 | 0 | 0 |
| 8 | 0 | 1 | 1 | 1 | 1 | 1 | 1 | 1 | 0 | 0 |
| 4 | 0 | 0 | 0 | 0 | 0 | 0 | 0 | 1 | 1 | 1 |
| 2 | 0 | 0 | 0 | 1 | 1 | 1 | 0 | 1 | 1 | 0 |
| 1 | 1 | 1 | 1 | 0 | 1 | 1 | 1 | 0 | 1 | 1 |
| Parity bits: | | 0 | 0 | 0 | ⓪ | 1 | 0 | 1 | 0 | |

The fourth parity bit indicates an error in the second bit (significance 64) of either the 2nd, 4th, 6th or 8th word of the block, which bits have again been circled, because:

$$1 \oplus 0 \oplus 0 \oplus 0 \neq 0$$

So 105, 11, 137 and 167 are suspect in the second bit, that is, the possible values of these words are, respectively:

105 or 41 (01101001 or 00101001)
11 or 75 (00001011 or 01001011)
137 or 201 (10001001 or 11001001)
167 or 231 (10100111 or 11100111)

An estimated value is now obtained for each of these words by forming the average of adjacent samples, thus:

½ (137 + 74) = 105.5 for word 2

½ (74 + 107) = 90.5 for word 4

½ (107 + 158) = 136.5 for word 6

½ (158 + 165) = 161.5 word 8

These estimated values are then compared with the possible values shown above. For word 2, the estimated value of 105.5 is nearer 105 than 41. For word 4, the estimated value of 90.5 is nearer 75 than 11. For word 6, the estimated value of 136.5 is nearer 137 than 201. For word 8, the estimated value of 161.5 is nearer 167 than 231. It is thus apparent that 105, 75, 137 and 167 are likely to be the correct values. The error in the second bit of the fourth word has been correctly detected and can be corrected, thus avoiding the sixteen-level error introduced by the concealment process, which substituted 91 instead of 75.

In an alternative and less preferred method, the differences between the received and estimated values for each word are likewise taken, thus:

For word 2, difference = 105 − 105.5 = −0.5
For word 4, difference = 11 − 90.5 = −79.5
For word 6, difference = 137 − 136.5 = +0.5
For word 8, difference = 167 − 161.5 = +5.5

The difference with the largest magnitude (plus or minus) is then taken to indicate that that is the incorrect word.

Both the known concealment method and the above-described correction method are dependent on the accuracy of the estimation. In the concealment method, inaccurate estimation may cause those words used to conceal errors to differ considerably from the correct words. In the correction method, inaccurate estimation may cause bits that are in error not to be corrected and, more seriously, may corrupt bits that are not in error. However, in the correction method, immunity to erroneous estimates increases with the significance of the doubtful bit.

For monochrome television signals, the average of the preceding and subsequent words can be used to estimate the value of suspect words. For colour signals sampled at three times subcarrier frequency, the average of third preceding and third subsequent words (words one cycle of colour subcarrier away) can be used to achieve good estimates in areas of uniform colour, but performance is poor in areas containing fast luminance transitions. The advantages of the monochrome and colour averaging estimates can be combined by using the estimate most suitable for the type of signals currently encountered. The choice of estimate can be judged from a running assessment of estimation accuracy for the two methods, using those parts of the signal which do not contain errors.

The method used for producing estimates will normally be an interpolation procedure. For example, use of the preceding word is zero-order interpolation, and use of the average of preceding and subsequent words as described above is first-order or linear interpolation. Undoubtedly, the use of higher order interpolation produces a general improvement in monochrome estimation accuracy, although some increases in processing complexity is required. For example, interpolation with a quadratic law requires the formation of:

$$y_n = y_{n+1} + \tfrac{1}{2}(y_{n-1} - y_{n+2})$$

or using a cubic law $$y_n = \tfrac{2}{3}(y_{n-1} + y_{n+1}) - 1/6(y_{n-2} + y_{n+2}) = \tfrac{1}{2}(y_{n-1} + y_{n+1}) + 1/6(y_{n-1} + y_{n+1} - y_{n-2} - y_{n+2})$$

where $y_{n-2}$, $y_{n-1}$, etc. are the values of consecutive words in the signal.

An improvement in colour estimation accuracy may be obtained by using suitably modified versions of these methods. Words taken from different television lines or fields can also be used in the estimation process.

A correction method in accordance with this invention is especially suitable for use with a digital television recorder for two reasons; firstly, since errors are corrected rather than concealed, quality is preserved through more generations of copying, and second, each parity bit protects a group of consecutive bits on one track on the tape, which simplifies the detection of bursts of errors.

Of the 42 tracks of one recorder, 40 tracks are used for the eight-bit words of the television signal, so that five consecutive words are spread across the tape at each point. The remaining two tracks are used for parity bits. If only the four most significant bits of each word are protected by parity, then ten signal bits must be protected by each parity bit. With the normal parity allocation, this would mean that the bits from 2½ words would be protected by one parity bit, and, in the event of an error, three words would need to be replaced to conceal the error. This much concealment would probably be more noticeable than the error.

With a correction method in accordance with this invention, ten consecutive bits on one track of the tape can be protected by one parity bit. These would be bits of the same significance from ten words taken at five word intervals from the waveform. In the case of an error the two possible values of each of these words can be compared with an estimate and, provided the estimated value is sufficiently accurate, the correct value chosen in each case.

The temporary loss of one track, perhaps due to a dust particle on the tape, could cause a burst of several hundred errors. With the normal parity allocation method a complicated assessment of the parity error indications must be made to determine which track is at fault. This is only possible if the relationship between the two parity bits and the five associated words is made to vary in a cyclic pattern. When the faulty track has been identified, the words likely to be affected by errors can be replaced to conceal the errors.

In the described correction method, each parity bit protects signal bits from only one track, so an error indication immediately identifies the track affected. However, if there are 2, 4, 6, 8 or 10 errors in a group, which is quite likely during bursts of errors, the parity check will not show an error. So, whenever a burst of errors is suspected, it is necessary to apply correction to all groups on the affected track, including those which give no error indication. Then any errors which are present will be corrected, although there is the risk of corrupting correct data if the estimate is inaccurate. An aid to the detection of an error burst is the possibility of counting the errors corrected in those groups with positive error indications to determine whether there are several errors or a single error in each group. If several errors are found, then an error burst is likely. Other circuits can be introduced into the recorder, for example, to monitor the envelope of the replayed signal to give an additional indication of the presence of an error burst.

FIG. 1 shows an error correction system embodying the principle of the above correction method. To an input 10 which receives an 8-bit pulse code modulated (p.c.m.) television signal is connected a parity generator 12 which produces parity bits from, in this example, the four most significant bits of the p.c.m. signal in accordance with Table 2. These parity bits are transmitted with the p.c.m. signal, making a total of 9 bits, over a transmission path 14 subject to errors. At the receiving end of the path 14, in a parity checker 16 parity bits are generated from the first four bits of the received signal and compared with the parity bits transmitted with the signal. The output signal from the parity checker 16 identifies the positions of possible errors in the signal for each of the four protected bits separately.

In the figures the number of bits transmitted over the various lines are indicated.

An estimator 18 produces an estimate of the signal value at each point in the waveform by interpolation, using nearby signal values. For example, FIG. 3 (described below) shows an estimator which forms the average of samples 3 words before and after the current signal value. The estimate is then subtracted from the received value and the difference is fed to a comparison logic unit 20.

The comparison logic unit 20 takes in the first four bits of the received signal, the possible error signal from the parity checker 16, and the difference signal from the estimator 18. If a possible error is indicated, the logic unit 20 calculates whether or not the difference signal is consistent both in sign and magnitude with an error in this position. When only one possible error occurs in a word, this can be done by rounding the difference signal to the level of the bit which may be in error. If this produces a '1' at this level, then the magnitude of the error is consistent. If the difference signal is positive, then the received value is larger than the estimated value. This suggests that a '0' in the transmitted word has been changed to a '1' in the received word. Therefore, a '1' in the position of the possible error is consistent with a positive difference signal since changing the '1' to a '0' will reduce the value of the difference signal. Similarly, the combination of a '0' in the position of a possible error and a negative difference signal is consistent with an error in this position. The circuitry for effecting this logic operation is described in more detail below with reference to FIG. 5. More than one possible error in a word can be dealt with by taking the possible errors in order of decreasing significance and, as each error is detected, correcting the difference signal accordingly.

When possible errors are indicated and the difference signal is consistent with such errors, the comparison logic unit produces a correction signal which causes an error corrector 22 to complement the value of the bit or bits in error.

Referring to the numerical example illustrated in Table 4, for the word in error, the received value is 11 and the estimated value is 90.5. Therefore, the difference signal would be −79.5. Since the possible error is in the 2nd bit, the number is rounded to the nearest integral multiple of 64, that is, −64. Since this corresponds to a '1' at the bit level which may be in error this is consistent with an error in this position. Also, the negative sign of the difference signal combined with a '0' in the suspect 2nd bit of the received signal is consistent with an error in this bit.

If one of the other words in the same parity group is considered, for example, word 8, the received value is 167 and the estimated value is 161.5. Therefore, the difference signal would be +5.5. This rounds to 0 as the nearest integral multiple of 64. This suggests that the received value is correct. Also, with the positive sign of the difference and the received value '0' for the second bit, altering the '0' to a '1' would increase the size of the difference between the word value and the estimate.

The construction of the various elements of FIG. 1 will now be described in more detail.

The parity generator 12 comprises four circuits 51 of the type illustrated in FIG. 2, one for each of the four most significant bits of each input word. Each of these circuits includes an input terminal 50 connected to the respective terminal 10 on FIG. 1. Terminal 50 is connected to an exclusive-OR gate 52 the output of which is in turn applied to a 2-bit shift register 54 which functions as a delay device, the output 56 of which constitutes the output of the circuit. The output 56 of shift register 54 is also applied through an AND gate 58 to the other input of exclusive-OR gate 52. A control input 60 is applied to the other input of the AND gate 58.

The exclusive-OR gate 52 and the loop through AND gate 58 serve to add successive inputs at terminal 50 in accordance with modulo 2. The shift register 54 provides a delay in the loop which interlaces information from alternate incoming words, that is words 1, 3, 5, etc. will be added modulo 2 as will words 2, 4, 6, etc., and the resultant outputs will be available successively at output 56. The circuit output can alternatively be taken from the output of gate 52. The AND gate 58 is opened by an enabling signal at the control input 60 during each block of eight input words and is closed (i.e. blocked) during the first word of each block to reset the circuit for the new block.

As noted above four circuits 51 of the type shown in FIG. 2 are provided and a controlled switch 62 selects the outputs of the circuits 51 in turn as one of the parity bits. In practice the eight-word blocks with respect to which the parity bits are generated may not be the same for all four digits. Thus, using the terminology of Table 2 the successive parity bits may be generated by expressions of the form:

$$P_{1r} = a_1 \oplus c_1 \oplus e_1 \oplus g_1$$

$$P_{1v} = b_1 \oplus d_1 \oplus f_1 \oplus h_1$$

$$P_{2r} = c_2 \oplus e_2 \oplus g_2 \oplus i_2$$

$$P_{2v} = d_2 \oplus f_2 \oplus h_2 \oplus j_2$$

$$P_{3r} = e_3 \oplus g_3 \oplus i_3 \oplus k_3$$

$P_{3v} = f_3 \oplus h_3 \oplus j_3 \oplus l_3$ $P_{4r} = g_4 \oplus i_4 \oplus k_4 \oplus m_4$ $P_{4u} = h_4 \oplus j_4 \oplus l_4 \oplus n_4$ The cycle then restarts with $i_1 \oplus k_1 \oplus m_1 \oplus 0_1$.

The estimator 18 of FIG. 3 is suitable for use with colour signals sampled at three times the colour subcarrier frequency. The circuit receives the input signal over a line 30 which is applied to two series-connected 3-word delay stages 32 and 34. The junction point of these two delays is connected to the non-inverting input of a subtractor 36. The input signal and the output of delay stage 34 are added in an adder 38, the output of which is divided by two in an attenuator 40 to provide the average of the input and 6-word-delayed signals. This average or estimated signal is applied to the inverting input of subtractor 36, the output of which includes a sign bit and is applied to the comparison logic unit 20 of FIG. 1. This difference signal thus represents the difference between a received word and the estimated value for that word.

The parity checker 16, comparison logic 20 and error corrector 22 of FIG. 1 are shown in more detail in FIG. 4. The parity checker 16 has an input 70 which receives the four most significant bits of the signal input, that is the signal from the transmission path 14. A parity generator 72 the construction of which is identical to that of the parity generator 12 described above is connected to the input 70. At an input 74 the parity bits are received and these are compared with the bits generated by parity generator 72 in an exclusive-OR gate 76. The exclusive-OR gate 76 provides an output whenever the parity bit differs from the corresponding bit generated by generator 72, indicating the presence of an error in the received information.

When an error is detected in this way the gate 76 activates four output lines connected to enabling circuits 80, 82, 84 and 86, associated with the four most significant bits respectively, an which re-associate the parity bit with the group of bits to which it relates. To this end each of these circuits, only one of which is shown in detail, includes a controlled switch 88 and a 2-bit shift register 90 connected as shown. These enabling circuits ensure correct timing of the correction enabling signals.

The comparison logic 20 of FIG. 1 comprises four circuits 92, 94, 96 and 98 associated respectively with the first, second, third and fourth most significant bits and connected respectively to be enabled by outputs from circuits 80, 82, 84 and 86. Each of the comparison circuits 92, 94, 96 and 98 also receives a respective bit of the signal input from transmission path 14, and the difference signal from subtractor 36 of estimator 18 shown in FIG. 3 is applied to the first comparison circuit 92 and thence successively through the other comparison circuits 94, 96 and 98. The comparison circuits 92, 94, 96 and 98 are essentially similar in construction and will be described in more detail below with reference to FIG. 5. Each comparison circuit provides an output to a respective exclusive-OR gate 100, 102, 104 or 106 which together constitute the error corrector 22. The other input of each exclusive-OR gate receives the respective bit of the signal input.

One of the comparison circuits, namely the circuit 96 for the third-most-significant bit is shown in more detail in FIG. 5. This circuit has an input 110 at which is received the difference signal which has passed through circuits 92 and 94. At an input 112 is received the third most significant bit of the input signal from transmission path 14, and at an input 114 is received the output of enabling circuit 84. The sign bit of the difference signal and the third signal bit are applied to an exclusive-OR gate 116. The rest of the difference signal is applied to a circuit 118 which detects whether the magnitude (i.e. modulus) of the difference signal is greater than or equal to 16, this being half the significance of the third bit.

An AND gate 120 receives the output of magnitude detecter 118, gate 116 and circuit 114. Thus AND gate 120 generates an output whenever:

i. the difference signal is greater than or equal to 16, and ii. the enabling circuit 84 indicates that an error exists, and iii. either the difference signal is positive and the third bit in the signal input is 1, or the difference signal is negative and the third bit in the signal input is 0.

When all these three conditions are fulfilled the AND gate 120 provides a correction output which is applied to gate 104 to change the third bit of the signal. The correction output is also applied to change the position of a switch 122 to that shown in FIG. 5 in which the magnitude of the difference signal is modified by subtracting the value 32 from it in subtractor 124. The resultant then constitutes the difference signal for comparison circuit 98.

It will be seen that the operation of the comparison circuit is in the presence of an error indication signal for the third bit to select a value (0 or 1) for the third bit which gives a value for the word nearest to the estimated value for that word.

Various control signals are referred to in the above description and these are generated by a control signal generator 126 (FIG. 4). The generator 126 uses entirely well-known techniques and its construction will be apparent to a person versed in the art from a consideration of the above-stated functions of the control signals, so that a detailed description thereof is not deemed necessary in this specification.

Thus methods have been described in which errors in digital signals can be corrected by using an estimate derived from the signal waveform to choose the correct value of a word from a set of possible values. This eliminates the residual errors left by conventional concealment methods. The use of second-or third-order interpolation methods for calculating expected values of the waveform can improve the performance of the method. If monochrome and colour estimation schemes are operated simultaneously, it is possible to choose automatically the most suitable estimate for the type of signals encountered. The detection of error bursts for the digital television recorder is simplified when each parity bit protects signal bits on only one track of the tape.

What I claim is:

1. A method of detecting errors in a received digital signal which comprises a plurality of words each of which consists of a plurality of bits, the signal having parity bits, wherein the method comprises generating parity bits, one for each of a group of bits of the received signal, to correspond with the received parity bits, comparing the generated parity bits with the corresponding received parity bits, and when the generated and received parity bits differ in respect of a group, estimating a value for each word containing a bit from the respective group, and comparing the estimated value with the received value for the word to detect any word containing an erroneous bit.

2. A method according to claim 1, wherein the generated parity bits are formed by selecting with a predetermined selection law a group of bits of the same significance from several different words, and combining the bits of the group with a predetermined combination law to provide a generated parity bit associated with the selected group.

3. A method according to claim 2, wherein each group comprises the bit of the same significance from a number of alternate words.

4. A method according to claim 3, wherein the bits are combined in accordance with modulo-2 addition.

5. A method according to claim 1, wherein the estimated value for a word is derived from at least one nearby word.

6. A method according to claim 5, wherein the estimated value for a word is derived by averaging a predetermined preceding word and a predetermined succeeding word.

7. A method according to claim 1, further comprising the step of correcting any detected erroneous bit by complementing the value of that bit.

8. Apparatus for detecting errors in a received signal which comprises a plurality of words each of which consists of a plurality of bits, the signal having parity bits, wherein the apparatus comprises generating means for generating parity bits from the received signal to correspond with the received parity bits, comparing means for comparing each generated parity bit with the corresponding received parity bit to provide an error signal indicating an error in one of the received words associated with the respective parity bit, and means responsive to the presence of an error signal for estimating a value for each of said words, and for comparing the estimated value with the values of said received words to detect any word containing an erroneous bit.

9. Apparatus according to claim 8, wherein the generating means comprises means for selecting with a predetermined selection law a group of bits of the same significance from several different words, and for combining the bits of the group with a predetermined combination law to provide a generated parity bit associated with the selected group.

10. Apparatus according to claim 9, wherein the generating means selects the bit of the same significance from a number of alternate words.

11. Apparatus according to claim 9, wherein the said means combines the bits in accordance with modulo-2 addition.

12. Apparatus according to claim 9, wherein the generating means comprises for the bits of each significance for which parity bits are generated, an input terminal arranged to receive only bits of one significance, an exclusive-OR gate one input of which is connected to the said input terminal and a delay device having an input coupled to the output of the exclusive-OR gate and an output coupled to the other input of the exclusive-OR gate.

13. Apparatus according to claim 9, wherein the generating means combines the selected bits in accordance with modulo-2 addition.

14. Apparatus according to claim 8, wherein the comparing means comprises an exclusive-OR gate.

15. Apparatus according to claim 8, wherein the means for estimating a value for each said word derives the estimated value from at least one nearby word.

16. Apparatus according to claim 15, wherein the said means for estimating derives the estimated value as the average of a predetermined preceding word and a predetermined succeeding word.

17. Apparatus according to claim 16, wherein the said means for estimating comprises two series-connected delay devices, and means for averaging the input and output of the delay devices to provide the estimated value.

18. Apparatus according to claim 8, wherein the means for comparing the estimated and received values comprises a subtractor for generating a difference signal representative of the difference between the estimated and received values, and the apparatus further comprises correction means responsive to the error signal for correcting the received signal in dependence upon the difference signal.

19. Apparatus according to claim 18, wherein the correction means comprises means for rounding the difference signal to the level of the bit for which the error signal is generated to produce a rounded signal, and means responsive to the rounded signal being a 1 to complement the value of the respective bit of the received signal.

* * * * *